(12) United States Patent
Lu et al.

(10) Patent No.: US 7,945,710 B2
(45) Date of Patent: May 17, 2011

(54) APPARATUS ENABLING THE HUMAN INTERFACE DEVICE TO PROVIDE A SMART CARD INTERFACE AND OPERATING METHOD THEREIN

(75) Inventors: Zhou Lu, Beijing (CN); Huazhang Yu, Beijing (CN)

(73) Assignee: Feitian Technologies Co., Ltd., Beijing P.R. (CN)

( * ) Notice: Subject to any disclaimer, the term of this patent is extended or adjusted under 35 U.S.C. 154(b) by 934 days.

(21) Appl. No.: 11/893,210

(22) Filed: Aug. 15, 2007

(65) Prior Publication Data

US 2008/0041931 A1 Feb. 21, 2008

(30) Foreign Application Priority Data

Aug. 15, 2006 (CN) .......................... 2006 1 0089285

(51) Int. Cl.
*G06F 3/00* (2006.01)
*G06F 7/04* (2006.01)
*G06F 13/14* (2006.01)
(52) U.S. Cl. .............................. 710/15; 726/17; 710/305
(58) Field of Classification Search .................... 710/15, 710/305; 726/17
See application file for complete search history.

(56) References Cited

U.S. PATENT DOCUMENTS

| | | | | |
|---|---|---|---|---|
| 6,915,347 B2 * | 7/2005 | Hanko et al. | ................. | 709/227 |
| 7,251,684 B2 * | 7/2007 | Surloff et al. | ................. | 709/217 |
| 7,849,301 B2 * | 12/2010 | Kwong et al. | ................. | 713/2 |
| 2003/0046472 A1 * | 3/2003 | Morrow | ........................ | 710/305 |
| 2005/0057519 A1 * | 3/2005 | Coe et al. | ...................... | 345/168 |
| 2005/0120170 A1 * | 6/2005 | Zhu | .............................. | 711/114 |
| 2005/0229247 A1 * | 10/2005 | Ishidera | .......................... | 726/17 |
| 2006/0129840 A1 * | 6/2006 | Milgramm et al. | ........... | 713/186 |
| 2007/0228164 A1 * | 10/2007 | Lu et al. | ......................... | 235/441 |
| 2007/0288937 A1 * | 12/2007 | Durojaiye et al. | ............. | 719/327 |

FOREIGN PATENT DOCUMENTS

CN 1346564 4/2002

* cited by examiner

*Primary Examiner* — Henry W Tsai
*Assistant Examiner* — Hyun Nam
(74) *Attorney, Agent, or Firm* — Scully, Scott, Murphy & Presser, P.C.

(57) ABSTRACT

The present invention provides an apparatus enabling the Human Interface Device (HID) to provide a smart card interface and an operating method therein. The apparatus is a virtual reader driver layer comprising a monitoring module for monitoring the connection and disconnection of the HID and obtaining the name of the HID object; a PC/SC interface module for providing a driver interface complying with the PC/SC Specification to the application layer, receiving the IRP sent from the application layer, and transmitting it to a data processing module; and a data processing module for receiving and processing the IRP sent from the application layer through the PC/SC interface module, and sending the IRP to the HID device class driver layer in accordance with the name of the HID object obtained by the monitoring module.

8 Claims, 3 Drawing Sheets

APPARATUS ENABLING THE HUMAN INTERFACE DEVICE TO PROVIDE A SMART CARD INTERFACE AND OPERATING METHOD THEREIN

CROSS-REFERENCE TO RELATED APPLICATION

This application claims priority from Chinese Patent Application No. 200610089285.6, filed on Aug. 15, 2006, entitled "Apparatus Enabling the Human Interface Device to Provide a Smart Card Interface and Operating Method Therein", the content of which is incorporated herein by reference in its entirety.

FIELD OF THE INVENTION

The present invention relates to an apparatus monitoring the human interface device in the kernel driver and the apparatus's operating method, and more particularly, to an apparatus enabling the human interface device to provide a smart card interface and operating method therein.

BACKGROUND OF THE INVENTION

Windows Driver Model (WDM) is a general driver model for Windows drivers, which is introduced by Microsoft Corporation. It is a strategy for making driver development simpler. With system upgrades, WDM is more and more useful and popular for Windows driver development. WDM uses a layered approach in which a given device is served by at least two drivers: a bus driver and a function driver. A device might also have filter drivers that add value or modify the behavior of the device. Each of the drivers divides the I/O request into simpler requests to transfer them to lower-level drivers. After receiving the I/O request, the bus driver begins interacting with the hardware through the Hardware Abstraction Layer to respond to the I/O request. In general, the smart card manufacturer provides a function driver with the physical smart card device. The function driver then communicates with the upper-level applications, as reader's interface. And it can also communicate with the bus driver at lower-level to read from or write to the hardware device. Both of the functions can be implemented by a single function driver, or by two individual function drivers as required (hereinafter collectively "the smart card device function driver"). When sent by an application, the data is transmitted through the smart card service system, the smart card device function driver, and the bus driver to the physical smart card device. When returned by the hardware device, the data is transmitted through the bus driver, the smart card device function driver, and the smart card service system to the application.

When developing the smart card device function driver, it is necessary to give a PC/SC callback function interface in the driver and specify a reader name in the device function driver. Generally, the callback function is given a name by its user. The function body is defined by the system. The callback function is used as follows: the user defines a function variable type before defining a variable of this type, and assigns a value to the variable, then passes the variable as an argument to the caller (typically the system itself), and finally the caller calls the callback function using the argument.

The application layer can initiate normal smart card communication using the PC/SC interface of the smart card service thereby. By doing so, the smart card can implement all of the smart card applications. The PC/SC Specification is a Windows platforms based standard user interface (i.e. API) which is promoted by the PC/SC Working Group that is made up of people from Microsoft Corporation and some world renowned smart card manufacturers. The Specification provides an integrated environment from the personal computer to the smart card. Applications can communicate with the smart card through the standard user interface.

The Human Interface Device (HID) can be used once after it is connected to the Windows based systems. The user does not need to install any driver developed for the device. All human interface devices use the HID device class driver (hidclass.sys) came with the system to establish relationship with applications. The programs at the application layer can gain access to the human interface device simply by calling existing application layer interface (HID API). A physical human interface device can satisfy generic user needs without additional modification to the system for this reason.

However, the application has to call HID API to gain access to the physical human interface device, because the HID device class driver (hidclass.sys) does not provide functions for the reader part and the data cannot be transmitted through the smart card service system directly. Thus, a problem comes that only a physical human interface device itself cannot implement the functions of the smart card.

SUMMARY OF THE INVENTION

To resolve the problem that the human interface device cannot be directly used in smart card applications and perform smart card functions, the present invention provides an apparatus enabling the human interface device to provide a smart card interface and operating method therein.

In one aspect of the present invention, there is provided an apparatus enabling the human interface device to provide a smart card interface and functioning as a virtual reader driver layer comprising: a monitoring module, a PC/SC interface module, and a data processing module; the monitoring module is adapted to monitor the connection and disconnection of the human interface device and obtain the name of the human interface device object; the PC/SC interface module is adapted to provide a driver interface complying with the PC/SC Specification to the application layer, receive the IRP sent from the application layer, and transmit it to the data processing module; and the data processing module is adapted to receive and process the IRP sent from the application layer through the PC/SC interface module, and send the IRP to the HID device class driver layer in accordance with the name of the human interface device object obtained by the monitoring module.

The data processing module establishes relationship with the HID device class driver layer by obtaining the name of the human interface device object.

In another aspect of the present invention, there is provided the operating method of the foresaid apparatus, comprising the steps of:

Monitoring:
 1) the monitoring module monitoring if a human interface device has been connected;
 2) if the human interface device has been connected, the monitoring module obtaining the name of the human interface device object at lower-level;
 3) the monitoring module determining if the connected human interface device needs to be processed;
 4) the monitoring module initializing the variables in the program and notifying the smart card service system of the connection of the smart card;
 5) the monitoring module monitoring if the human interface device has been disconnected; if so, the monitoring module releasing the system resources occupied by the human interface device since its connection, and notifying the smart card service system of the disconnection of the smart card;

Data Processing:

A. the data processing module receiving the IRP relating to the human interface device, which is sent from the application layer, and reorganizing the IRP in accordance with the HID data transfer protocol;

B. the data processing module sending the reorganized IRP to the HID device class driver layer at lower-level for data interacting, and returning the result to the application layer.

Optionally, the monitoring module monitors the connection of the human interface device with a registered callback function in Step 1).

Optionally, the monitoring module monitors the connection of the human interface device in the polling manner in Step 1).

Optionally, the monitoring module obtains the name of the human interface device object at lower-level in accordance with the arguments of the registered callback function in Step 2).

Optionally, the monitoring module monitors the disconnection of the human interface device with the registered callback function in Step 5).

Optionally, the monitoring module monitors the disconnection of the human interface device in the polling manner in Step 5).

Optionally, the data processing module performs data interaction with the HID device class driver layer at lower-level by constructing the IRP of IOCTL_HID_* type and in accordance with the name of the human interface device object in Step B.

The present invention provides an additional channel for access to the human interface device by building a virtual reader driver layer. Thus, the present invention enables the human interface device to provide smart card functions.

BRIEF DESCRIPTION OF THE DRAWINGS

The present invention may be further understood from the following description in conjunction with the appended drawings. In the drawings.

DETAILED DESCRIPTION OF THE PREFERRED EMBODIMENTS

The present invention is further described with the embodiments below.

Figure 1:
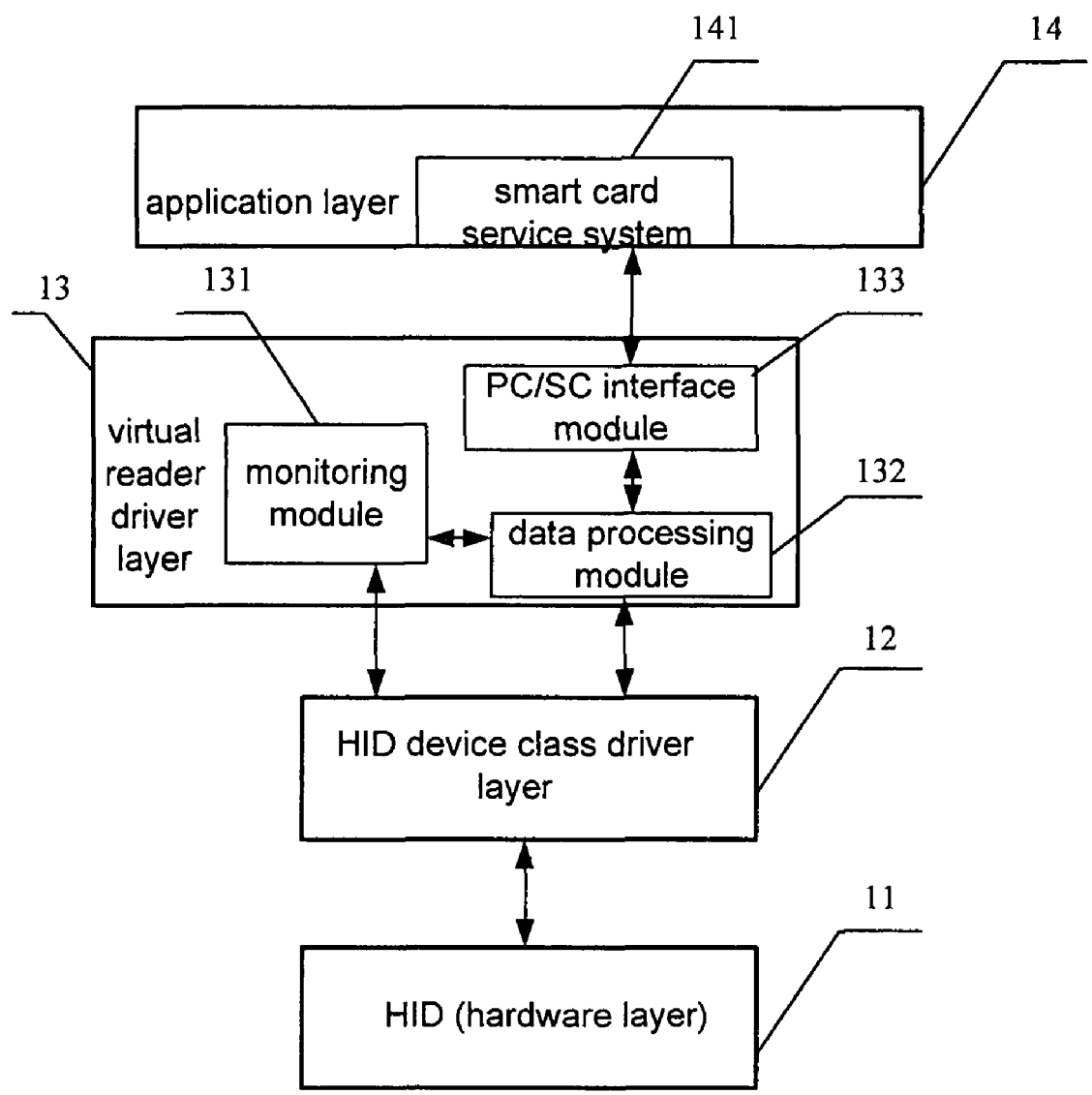
FIG. 1 is a schematic of the driver architecture of the present invention.

Referring to FIG. 1, the apparatus enabling the human interface device to provide a smart card interface of the present invention is a virtual reader driver layer (13) added to the driver architecture of the prior art. Then the driver architecture comprises 4 basic layers: the human interface device (the hardware layer, 11), the HID device class driver layer (hidclass.sys, 12), the virtual reader driver layer (13) and the application layer (14).

The virtual reader driver layer (13) comprises a monitoring module (131) for monitoring the connection and disconnection of the human interface device (11) and obtaining the name of the device, a data processing module (132) for receiving and processing the IRP sent from the application layer through the PC/SC interface module (133) and sending the IRP (IO Request Package) to the HID device class driver layer (12) in accordance with the name of the human interface device object (11) obtained by the monitoring module (131), and a PC/SC interface module (133) for providing the application layer (14) with a driver interface complying with the PC/SC specification, receiving the IRP sent from the application layer (14), and sending the IRP to the data processing module (132).

The data processing module (132) establishes relationship with the HID device class driver layer (12) by obtaining the name of the human interface device object.

The application (14) can gain access to the human interface device (11) through the smart card service system (141) to monitor the human interface device (11).

The virtual reader driver layer (13) provides the application layer (14) with the driver interface complying with the PC/SC specification. The driver interface might be:

RDF_TRANSMIT
RDF_CARD_POWER
RDF_SET_PROTOCOL
RDF_CARD_TRACKING
RDF_CARD_EJECT
RDF_READER_SWALLOW
RDF_DEBUG_LEVEL
RDF_CARD_CONFISCATE
RDF_IOCTL_VENDOR
RDF_ATR_PARSE

These interfaces are managed as required. Here the following 3 interfaces are mainly managed:

RDF_TRANSMIT
RDF_CARD_POWER
RDF_SET_PROTOCOL

The user registers a callback function CallbackRoutine with the function Io Register Plug Play Notification provided with DDK (Driver Development Kit) in the virtual reader driver layer (13). The monitoring module (131) in the virtual reader driver layer (13) monitors the connection and disconnection of the human interface device (11) with the callback function CallbackRoutine. Io Register Plug Play Notification is defined as follows:

NTSTATUS
Io Register Plug Play Notification
IN IO_NOTIFICATION_EVENT_CATEGORY Event Category,
IN ULONG Event Category Flags,
IN PVOID Event Category Data OPTIONAL,
IN PDRIVER_OBJECT Driver Object,
IN PDRIVER_NOTIFICATION_CALLBACK_ROUTINE CallbackRoutine,
IN PVOID Context,
OUT PVOID *Notification Entry Where the parameter Event Category Data is to be set to the GUID registered with hidclass.sys in the HID device driver layer (12) and the parameter CallbackRoutine is the callback function that will be processed by the virtual reader driver layer (13).

The operating method of the apparatus, i.e. the virtual reader driver layer (13), described as above involves monitoring and data processing. The virtual reader driver layer functions once it has been loaded successfully. The function Io Register Plug Play Notification is used to register the callback function CallbackRoutine during the loading.

Figure 2:
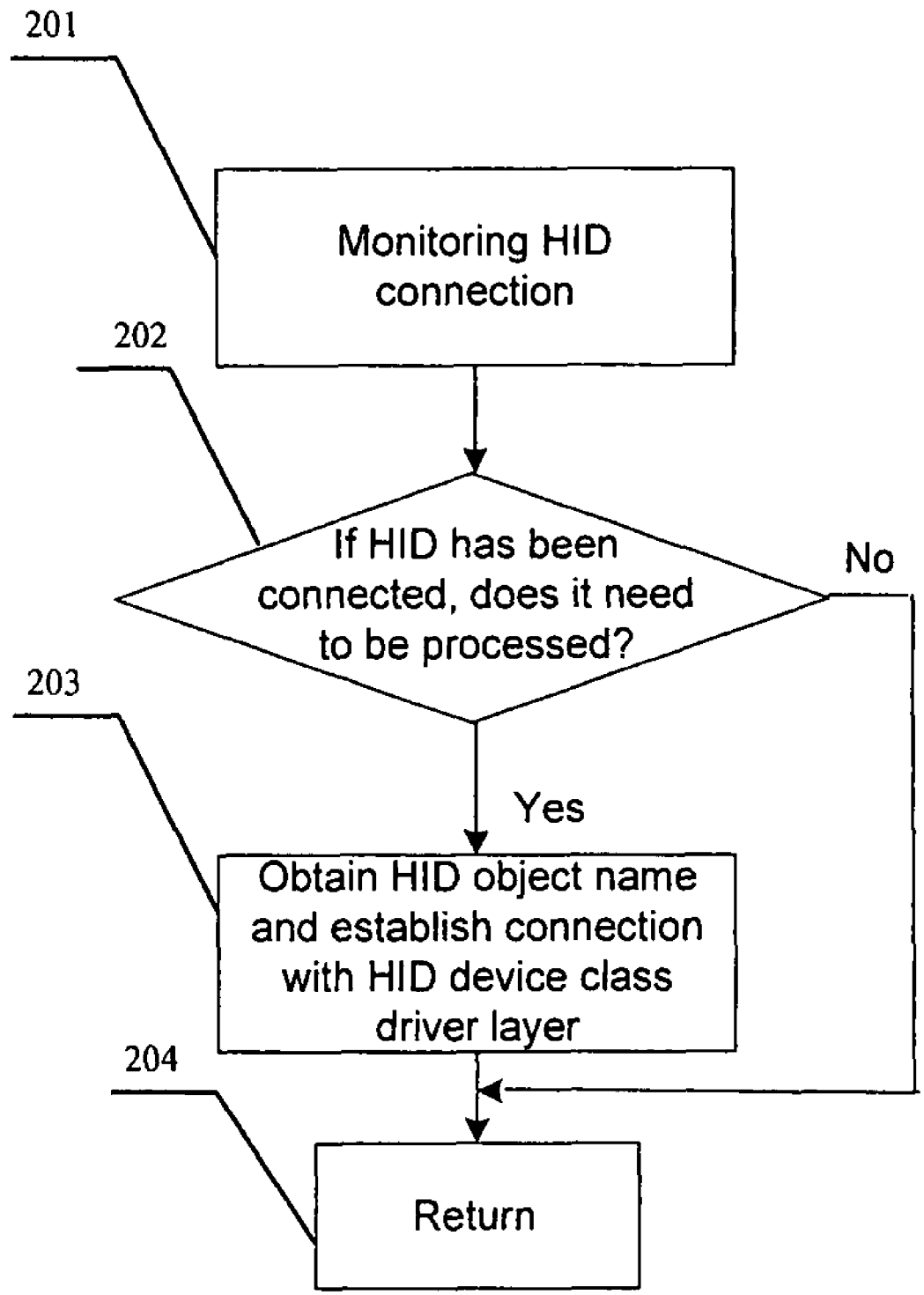
FIG. 2 is the work flow of the apparatus enabling the human interface device to provide a smart card interface of the present invention when monitoring the connection of the human interface device.

Referring to FIG. 2, when monitoring the connection of the human interface device the monitoring module in the virtual reader driver layer performs operations as follows:

Step 201: The monitoring module monitors the connection of the human interface device with the callback function CallbackRoutine once it has been connected; or the monitoring module monitors the connection of the human interface device in the polling manner;

Step 202: the monitoring module obtains the name of the human interface device at lower-level, and determines if the connected human interface device needs to be processed; if it does not need to be processed, skip the next step;

Step 203: The monitoring module obtains the name of the human interface device object at lower-level, establishes relationship with the human interface device, notifies the smart card service system of the connection of the smart card, and sets the "on" flag for the smart card service to bring the virtual reader driver layer into waiting status;

Step 204: Return.

The monitoring module can monitor the disconnection of the human interface device either with the callback function CallbackRoutine or in the polling manner. When the disconnection of the human interface device has been monitored, the monitoring module releases the system resources occupied by the human interface device since its connection, and notifies the smart card service system of the disconnection of the smart card.

Figure 3:
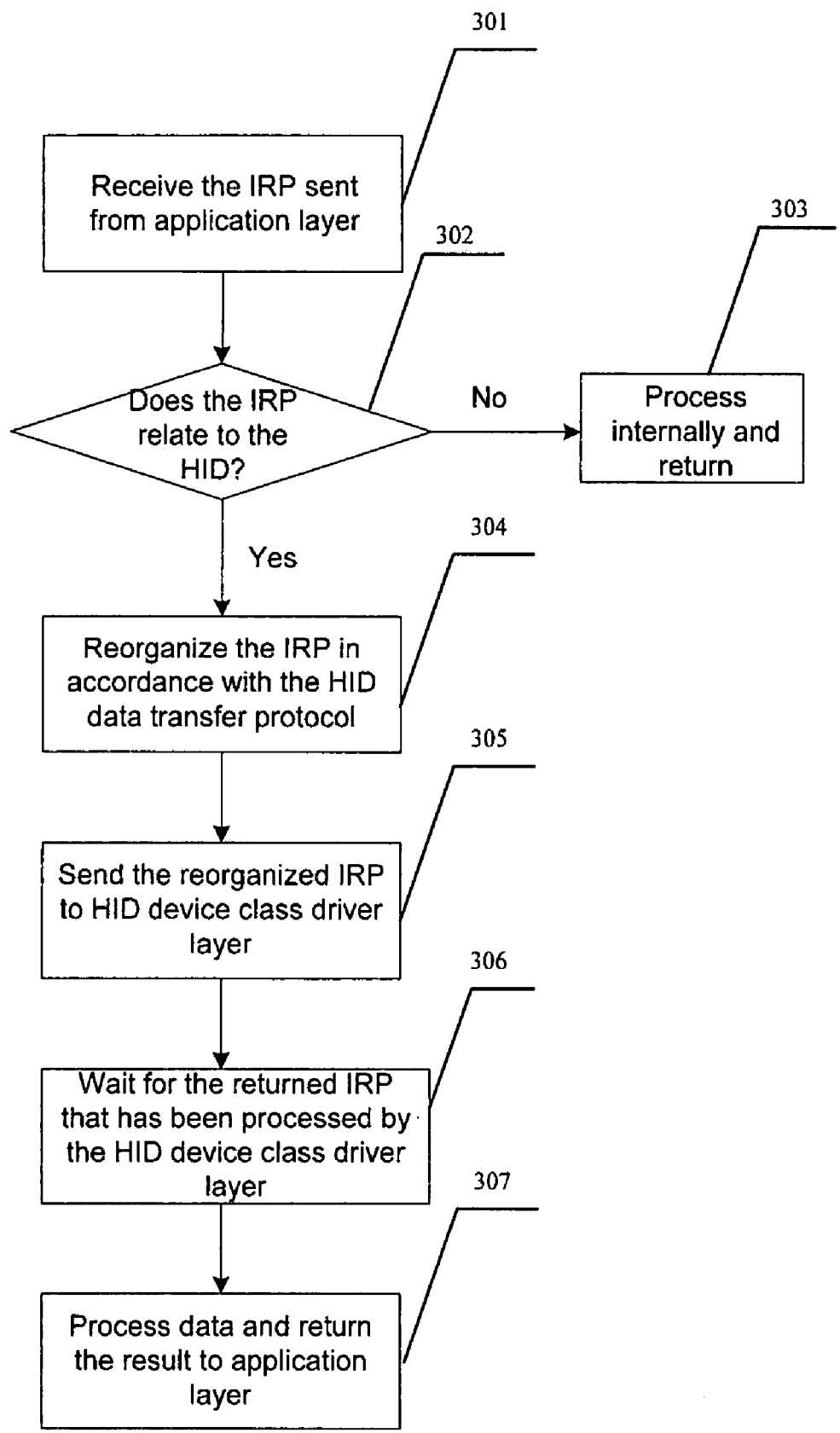
FIG. 3 is the work flow of the apparatus enabling the human interface device to provide the smart card interface of the present invention when processing data.

Referring to FIG. 3, when processing data the data processing module in the virtual reader driver layer performs operations as follows:

Step 301: The data processing module receives the IRP sent from the application layer;

Step 302: The data processing module determines if the received IRP relates to the human interface device (HID); if it does, skip the next step;

Step 303: The data processing module processes the IRP internally, and returns the result to the application;

Step 304: The data processing module reorganizes the IRP in accordance with the HID data transfer protocol;

Step 305: The data processing module sends the reorganized IRP to the HID device class driver layer;

Step 306: The data processing module waits for the processed IRP returned by the HID device class driver layer;

Step 307: The data processing module processes the returned IRP, and returns the result to the application layer.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

The invention claimed is:

1. A method for operating an apparatus for enabling a human interface device (HID) to provide a smart card interface, the apparatus being a virtual reader driver layer comprising
    a monitoring module for monitoring connection and disconnection of the HID and obtaining a name of a human interface device object,
    a Personal Computer/Smartcard (PC/SC) interface module for providing a driver interface complying with a PC/SC Specification Version 2.01.3 to an application layer, receiving an I/O Request Package (IRP) sent from the application layer, and transmitting it to a data processing module, and
    the data processing module for receiving and process the IRP sent from the application layer through the PC/SC interface module, and sending the IRP to a HID device class driver layer in accordance with the name of the human interface device object obtained by the monitoring module,
the method comprising:
the monitoring module monitoring if the HID is connected;
if the HID is connected, the monitoring module obtaining the name of the human interface device object at lower-level;
the monitoring module determining if the connected HID needs to be processed;
the monitoring module initializing variables in a program and notifying a smart card service system of the connection of a smart card;
the monitoring module monitoring if the HID is disconnected; if so, the monitoring module releasing system resources occupied by the HID since its connection, and notifying the smart card service system of the disconnection of the smart card;
the data processing module receiving the IRP relating to the HID, which is sent from the application layer, and reorganizing the IRP in accordance with a HID data transfer protocol; and
the data processing module sending the reorganized IRP to the HID device class driver layer at lower-level for data interacting, and returning the result to the application layer.

2. The method of claim 1, wherein the monitoring module monitors the connection of the HID with a registered callback function.

3. The method of claim 1, wherein the monitoring module monitors the connection of the HID in the a polling manner.

4. The method of claim 1, wherein the monitoring module obtains the name of the human interface device object at lower-level in accordance with arguments of a registered callback function.

5. The method of claim 1, wherein the monitoring module monitors the disconnection of the HID with a registered callback function.

6. The method of claim 1, wherein the monitoring module monitors the disconnection of the HID in a polling manner.

7. The method of claim 1, wherein the data processing module performs data interaction with the HID device class driver layer at lower-level by constructing the IRP of IOCTL_HID_* type and in accordance with the name of the human interface device object.

8. The method of claim 1, further comprising obtaining the name of the human interface device object for establishing a relationship of the data processing module with the HID device class driver layer.

* * * * *